Aug. 9, 1949.　　　R. H. SULLIVAN ET AL　　　2,478,848
ELECTRIC MOTOR SPEED CONTROL SYSTEM
Filed Dec. 7, 1945
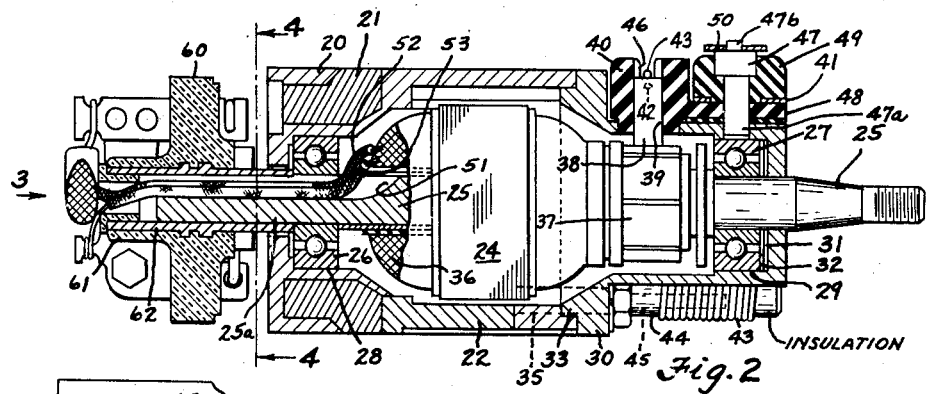
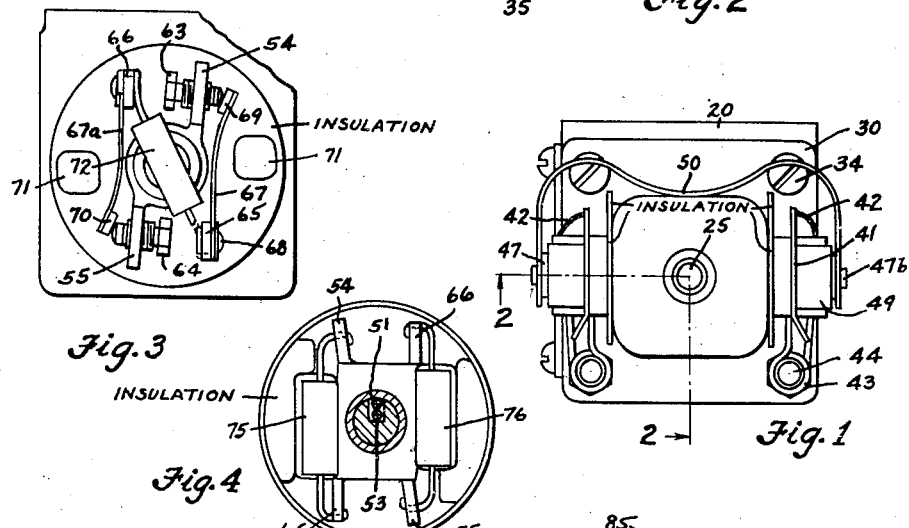
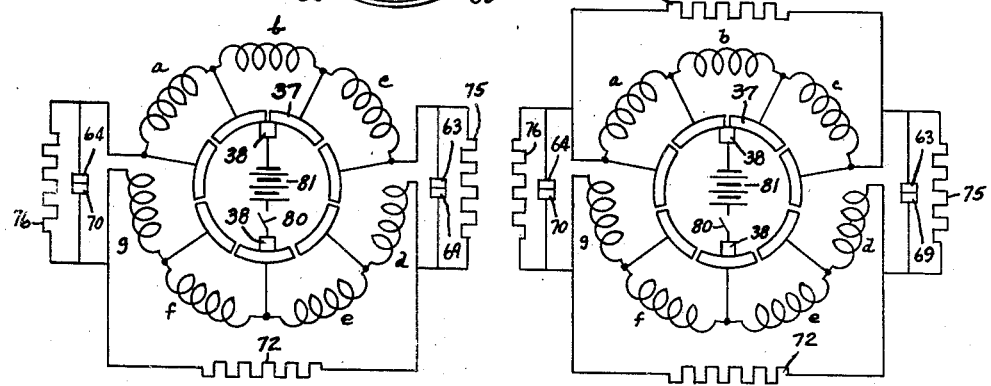
INVENTORS
RAYMOND H. SULLIVAN
VAUGHN H. HARDY AND
BY HERBERT C. PORTER
Spencer, Hardman & Fehr
THEIR ATTORNEYS Patented Aug. 9, 1949

2,478,848

UNITED STATES PATENT OFFICE 2,478,848

ELECTRIC MOTOR SPEED CONTROL SYSTEM

Raymond H. Sullivan, Vaughn H. Hardy, and Herbert C. Porter, Rochester, N. Y., assignors to General Motors Corporation, Detroit, Mich., a corporation of Delaware Application December 7, 1945, Serial No. 633,466

3 Claims. (Cl. 318—325)

This invention relates to improvements to governors for commutator motors and more particularly to a device for preventing sparking at the contacts in the governors and at the brushes.

An object of the present invention is to provide a circuit breaker and resistor arrangement in such a governor wherein the circuit breaker will open when the speed of the armature reaches a predetermined speed so that no sparking will occur at the opening of the circuit breaker nor at the brushes. In the disclosed embodiments of the invention this object is accomplished by the use of governors paralleling control resistances which are in series with the armature coils in combination with one or more resistances in parallel with armature coils. A further object is to provide for easy assembly or removal of the brush rigging of the motor.

Further objects and advantages of the present invention will be apparent from the following description reference being had to the accompanying drawings wherein preferred embodiments of the present invention are clearly shown.

In the drawings:

Fig. 1 is an end view of the electric motor embodying the present invention.

Fig. 2 is a sectional view taken on line 2—2 of Fig. 1.

Fig. 3 is a view taken in the direction of arrow 3 of Fig. 2.

Fig. 4 is a sectional view taken on line 4—4 of Fig. 2.

Fig. 5 is a wiring diagram of a motor including switches and resistors arranged in accordance with this invention with the switch connections in the positions assumed at low or normal speeds.

Fig. 6 is a wiring diagram similar to Fig. 5, but showing a second embodiment of the invention.

Referring to Figs. 1 to 4 inclusive 20 designates a cup-shaped housing made of die cast metal and carrying a permanent, ring-shaped magnet 21 and two diametrically opposite pole pieces 22 one of which is shown in Fig. 2. The housing 20 encloses a rotating armature core 24 mounted on a shaft 25 rotatably supported by ball bearings 26 and 27. The bearing 26 is supported in a recess 28 provided at the closed end of the housing and the bearing 27 is mounted in a suitable recess 29 formed in an end member 30. The outer races of bearing 27 have a sliding fit in the recess 29. End play of the shaft 25 is taken up by a spring washer 31, having one face thereof bearing against the end wall of the recess 29. The washer 31 is provided with a plurality of spring fingers 32 which preferably engage the outer race of bearing 27 as shown.

The open end of the housing 20 is provided with an annular portion to receive telescopically a flange 33 of the end member 30. This end member 30 is maintained in assembled relation with the housing by screws 34 and posts 35 having threaded engagement with the housing 21.

The armature carries windings 36 attached to commutator segments 37 in the proper manner. The commutator is engaged by a pair of brushes 38 only one of which is shown in Fig. 2. The brushes are slidable in guide channels 39 provided by a brush holder 40 of insulating material. Each brush 38 is connected with a terminal clip 41 by a pig tail 42 soldered thereto. Each brush is urged toward the commutator by a coil spring 43. In this instance each spring 43 is mounted upon an insulating sleeve or body 44 preferably molded around an extension 45 of the post 35 see Fig. 2. Each spring 43 has one end engaging a stop provided by the end member 30 while the other end is guided in a groove 46 provided in the upper end of the channel 39 to urge a brush 38 against the commutator.

The brush holders 40 and terminal clips 41 are removably attached to the end member by pins 47. The brush holders have arms 48 provided with openings to receive bosses of insulating blocks 49, said bosses also project through an opening in the clip member 41. Counterbored holes are formed in the blocks which receive the pins, said pins having shoulders that seat against the ledge formed by the counterbore. The lower ends 47a of the pins 47 project into openings provided by end member 30. A U-shaped spring 50 has its arms so formed and tensioned that they will bear against the outer end of the pins 47 to urge the pins radially inward into the openings of the end member 30 and, thus hold the brush holders 40 in assembled relation with the end member. The upper ends of the pins have projections 47b which extend freely into openings provided by the arms of the spring member. By this arrangement the spring 50 can be easily removed from the pins to permit removal thereof.

The end 25a of the armature shaft 25 is provided with a groove 51 extending parallel with the axis of the shaft, said grooves receiving insulated cables 52 and 53, each including a pair of conducting wires connected with certain armature coils 36 and having the other ends connected with contact plates 54 and 55.

The end 25a of the shaft 25 supports a centrifugal governor or speed responsive device adapted to control the speed of the motor. The governor, as shown, comprises a base or disc 60 and a hub 61 of insulating material molded about a metal sleeve 62. Plates 54 and 55 are fixed to the disc 60, said plates extending a certain distance on each side of the disc. The plate 54 supports an adjustable contact 63 while plate 55 supports an adjustable contact 64. The base also has a pair of conducting bars 65 and 66 extending therethrough to which flat conducting springs 67 and 67a are respectively attached by rivets 68. The free ends of the springs 67 and 67a carry contacts 69 and 70 respectively, said springs being so biased that they hold their respective contacts in engagement with the adjustable contacts 63 and 64. The contacts 69 and 70 will be in engagement with contacts 63 and 64 until centrifugal force overcomes the tension of the springs 67 and 67a which occurs when the motor armature exceeds the speed for which the governor is adjusted. The tension of springs 67 and 67a may be varied by adjusting the contacts 63, 64. By proper adjustment of contacts 63, 64 the spring tension in the springs is just sufficient to hold the contacts 69 and 70 in engagement with their respective contacts 63 and 64 with the motor running at the desired speed. When this speed is exceeded the springs 67 and 67a move toward stops 71 carried by the base 60 and thus separate the contacts 69, 70 and break short-circuits around the resistors 75 and 76 shown in Fig. 5. The bars 65, 66 also project beyond the rear face of the base 60. The rear side of disc is suitably recessed to receive resistors 75 and 76. The resistor 75 is connected with the plate 54 and the bar 65; and the resistor 76 is connected with the plate 55 and the bar 66. A resistor 72 which parallels certain armature coils is electrically connected with the bars 65 and 66 at the front of the disc, see Figs. 2 and 3.

In Figs. 5 and 6, the armature coils (collectively numbered 36 in Fig. 2) are individually designated by letters *a* to *g*. These coils are connected with the commutator segments 37 as shown. A battery 81 and a switch 80 are connected with the brushes 38. A conventional two-pole lap armature winding is thus provided. This is equivalent to two circuits connected in parallel across the brushes or battery. One circuit includes armature coils *a*, *g*, and *f* in series with the control resistor 76 normally shorted by contacts 64 and 70. The other circuit includes coils *c*, *d* and *e* in series with the control resistor 75 normally shorted by contacts 63 and 69.

When the switch 80 is closed, a voltage will be impressed across the brushes 38 and a current will flow into the armature. This current will divide and pass through the two armature circuits thereby causing the armature to rotate at a speed depending upon the constants of the circuits. At all speeds below the desired governed speed, the governor contacts remained closed; and the speed is proportioned to the input voltage. When the desired governed speed is reached, the governor contacts open and render the resistors 75 and 76 effective to reduce the armature current. The speed decreases and the governor contacts close. The speed increases and the governor contacts open again. So long as the impressed voltage is higher than required to force normal current through the armature, this sequence of operation will be continually repeated at a comparatively high frequency with practically negligible speed differential between open contact and closed contact condition.

It would be possible to control the speed of the motor by the use of the governor contacts without the control resistors, but the speed regulation would be jerky and uneven due to excessive sparking at the governor contacts. Also the brush life would be relatively short due to inductive sparking at the brushes when the governor contacts are open. To minimize sparking at the brushes and governor contacts, and to obtain a smoother speed regulation the present invention provides electrical damping means for reducing the time rate of change of current when the governor contacts open. It is important that the damping means be put on the armature side of the brushes. It is practically useless to put damping means across the brush terminals. Sparking is materially reduced by the damping resistors 75 and 76 connected across the governor contacts. Sparking is further reduced and the range of voltage in which governed speed can be maintained is increased by using, with resistors 75 and 76, one or more resistors in parallel with groups of armature coils such as resistor 72 alone (Fig. 5) or resistors 72 and 85 (Fig. 6).

The following example is given to show what can be accomplished. A certain electric motor having a governor speed of 10,000 R. P. M. and designed to operate at approximately 34 volts is equipped with 200 ohm resistors 75 and 76, resistor 72 being omitted. The maximum controlled voltage or maximum voltage at which governed speed can be controlled is 30.9 volts. When a 200 ohm resistor 72 is used with resistors 75 and 76 the maximum controlled voltage is raised to 34.6 volts and circuit damping is still further improved. That is, sparking is even less than when resistors 75 and 76 are used without resistor 72. The armature circuit may be used with a magnetic field excited by a shunt field winding, or by a series field winding or by a permanent magnet.

While the embodiments of the present invention as herein disclosed, constitute preferred forms, it is to be understood that other forms might be adopted, all coming within the scope of the claims which follow.

What is claimed is as follows:

1. The combination of a commutator motor including a field magnet and armature windings arranged in two sections; and a governor driven by the armature of the motor and having two sets of normally closed contacts which open in response to the attainment of a predetermined speed, each set of contacts being connected in series with each section of the armature windings and having resistances each connected in parallel with a set of contacts and having at least one resistance unit connected in parallel with a section of the armature winding.

2. The combination of a commutator motor including a field magnet and armature windings arranged in opposed sections; and a governor driven by the armature of the motor and having two sets of normally closed contacts which open in response to the attainment of a predetermined speed, each set of contacts being connected in series with opposed sections of the armature windings to complete an armature circuit and having resistances each connected in parallel with a set of contacts, said resistance being connected in series with the opposed sections of armature winding upon separations of the contacts, and having a resistance connected in shunt with each section of the armature windings.

3. The combination of a commutator motor including a field magnet and armature windings arranged in opposed sections; normally closed centrifugal switch means for completing the armature circuit; a resistance unit connected in parallel with the switching means, the arrangement being such that at a predetermined rise in motor speed, said switching means will open and automatically include the resistance in the armature circuit; and a resistance connected in parallel with at least one of the sections of the armature windings.

RAYMOND H. SULLIVAN.
VAUGHN H. HARDY.
HERBERT C. PORTER.

REFERENCES CITED

The following references are of record in the file of this patent:

UNITED STATES PATENTS

| Number | Name | Date |
| --- | --- | --- |
| 1,756,332 | Becker | Apr. 29, 1930 |
| 2,032,444 | Schwarz | Mar. 3, 1936 |
| 2,176,804 | Roth et al. | Oct. 17, 1939 |
| 2,348,684 | Perkins | May 9, 1944 |
| 2,395,080 | Stoller | Feb. 19, 1946 |